(12) United States Patent
Bradea et al.

(10) Patent No.: US 12,718,071 B2
(45) Date of Patent: Aug. 25, 2026

(54) GENERATING PERSONALIZED CONTENT USING GENERATIVE ARTIFICIAL INTELLIGENCE

(71) Applicant: Adobe Inc., San Jose, CA (US)

(72) Inventors: Razvan Bradea, Bucharest (RO); Lucian Andrei Radu, Bucharest (RO)

(73) Assignee: Adobe Inc., San Jose, CA (US)

( * ) Notice: Subject to any disclaimer, the term of this patent is extended or adjusted under 35 U.S.C. 154(b) by 545 days.

(21) Appl. No.: 18/237,855

(22) Filed: Aug. 24, 2023

(65) Prior Publication Data

US 2025/0068893 A1 Feb. 27, 2025

(51) Int. Cl.

| | |
|---|---|
| ***G06N 3/04*** | (2023.01) |
| ***G06N 3/0475*** | (2023.01) |
| ***G06N 3/082*** | (2023.01) |
| *G06Q 30/0601* | (2023.01) |

(52) U.S. Cl.

CPC .......... *G06N 3/0475* (2023.01); *G06N 3/082* (2013.01); *G06Q 30/0631* (2013.01)

(58) Field of Classification Search

CPC ... G06N 3/0475; G06N 3/082; G06Q 30/0631

See application file for complete search history.

(56) References Cited

U.S. PATENT DOCUMENTS

| | | | | |
|---|---|---|---|---|
| 2024/0256792 | A1 * | 8/2024 | Maschmeyer .......... | G06F 40/40 |
| 2024/0265274 | A1 * | 8/2024 | Parasnis .................. | G06F 40/30 |
| 2024/0329942 | A1 * | 10/2024 | Saxena ................... | G06F 40/20 |

OTHER PUBLICATIONS

Epsilon "The Power of Me: The Impact of Personalization on Marketing Performance" Available online at https://www.slideshare.net/EpsilonMktg/the-power-of-me-the-impact-of-personalization-on-marketing-performance, Jan. 4, 2018, 6 pages.

Adobe Summit, "Save the Date. Then Get Ready for Growth", Available at https://business.adobe.com/summit/adobe-summit.html, 2023, 9 pages.

(Continued)

*Primary Examiner* — Dave Misir

(74) *Attorney, Agent, or Firm* — Kilpatrick Townsned & Stockton LLP

(57) ABSTRACT

Techniques for generating personalized content using generative artificial intelligence (AI) are provided. In an example method, a processing device including a personalization module receives an indication that a user interacted with content displayed on a web page. The personalization module receives a set of attributes, comprising information about the user and information about the content, and information about a segment to which the user belongs. The processing module then determines a tuning parameter, wherein the tuning parameter controls the randomness of the output of the generative AI model. The personalization module next inputs to the generative AI model the tuning parameter and a prompt comprising the set of attributes and the information about the segment and subsequently receives personalized content responsive to the tuning parameter and the prompt. The personalization module can then display the personalized content in a dynamic content field associated with the content.

20 Claims, 7 Drawing Sheets

(56) References Cited

OTHER PUBLICATIONS

Adobe Experience Cloud, "Personalization at Scale Study", Be the One. For Everyone, Available at https://business.adobe.com/resources/personalization-at-scale-report.html, 7 pages.
Deloitte Digital, "Personalizing Growth", Available at https://www.deloittedigital.com/us/en/offerings/customer-led-marketing/advertising--marketing-and-commerce/personalizing-growth.html, 2023, 9 pages.
Klipfolio, "Average Time on Page", Available at https://www.klipfolio.com/resources/kpi-examples/digital-marketing/average-time-on-page, 2001-2023, 12 pages.
Aravind, Cloud Odyssey, "Top Salesforce Products to Supercharge ChatGPT's Effectiveness!" Available at https://cloudodyssey.co/blog/top-salesforce-products-to-supercharge-chatgpts-effectiveness/, 2023, 13 pages.
Tellez, Anthony, Forbes, "These Major Companies—From Snap to Salesforce—Are All Using ChkatGPT", Available at https://www.forbes.com/sites/anthonytellez/2023/03/03/these-major-companies-from-snap-to-instacart--are-all-using-chatgpt/?sh=4ac59f194132, Mar. 3, 2023, 5 pages.
Loten, Angus, The Wall Street Journal, "Instacart Joins ChatGPT Frenzy, Adding Chatbot to Grocery Shopping App", Available at https://www.wsj.com/articles/instacart-joins-chatgpt-frenzy-adding-chatbot-to-grocery-shopping-app-bc8a2d3c?mod=tech_lead_pos10, Mar. 1, 2023.
Experience League, "Catalog Service for Adobe Commerce", Available at https://experienceleague.adobe.com/docs/commerce-merchant-services/catalog-service/overview.html?lang=en, 2023, 4 pages.
Experience League, "Segmentation Service Overview", Available at https://experienceleague.adobe.com/docs/experience-platform/segmentation/home.html?lang=en, 2023, 6 pages.
Microsoft, "Azure OpenAI Service Models", Available at https://learn.microsoft.com/en-GB/azure/ai-services/openai/concepts/models, Aug. 22, 2023, 11 pages.
Businesswire, "Salesforce Unveils Marketing GPT and Commerce GPT to Personalize Every Campaign and Shopping Experience with Generative AI", Available at https://www.businesswire.com/news/home/20230607005241/en/Salesforce-Unveils-Marketing-GPT-and-Commerce-GPT-to-Personalize-Every-Campaign-and-Shopping-Experience-with-Generative-AI, 2023, 3 pages.
Salesforce, Commerce, "Power Growth Everywhere with Commerce GPT", Available at https://www.salesforce.com/products/commerce/?d=cta-body-promo-8, 2023, 22 pages.
Salesforce, "Marketing Cloud Personalization", Available at https://www.salesforce.com/products/marketing-personalization/, 2023, 39 pages.

* cited by examiner

300

GENERATING PERSONALIZED CONTENT USING GENERATIVE ARTIFICIAL INTELLIGENCE

TECHNICAL FIELD

This disclosure generally relates to web page generation and administration and, more specifically, to techniques for generating personalized content using generative artificial intelligence.

BACKGROUND

User engagement refers to the degree to which a user interacts with digital content. Engagement is at its zenith when users are presented with personalized content. Content can be personalized on the basis of a variety of information. For example, personalized content can be added to a web page based on information learned about users such as demographics, browsing history, or other behaviors. Manually curating personalized content for each individual user is impractical, however. This problem is sometimes made tractable by segmenting the user population into different groups based on criteria such as location, age, lifestyle, and so on. Personalized content can then be mapped to the resulting user segments.

Important components of promoting engagement with digital content include the changing or updating of content based on explicit and implicit user feedback. For instance, a user may explicitly add a product to a wish list or exhibit a browsing history that indicates an elevated level of interest in the product. These signals are useful indicators for the developers of personalized content to change or update content to optimize the likelihood of a positive event, like a purchase.

SUMMARY

Some embodiments described herein relate to techniques for generating personalized content using generative artificial intelligence (AI). In an example method, a personalization module includes a processing device that receives an indication that a user has interacted with content displayed on a web page. The personalization module then receives a set of attributes, including information about the user and information about the content, as well as information about a segment to which the user belongs. The personalization module next receives a tuning parameter for a generative AI model, in which the tuning parameter controls the randomness of the output of the generative AI model. The personalization module inputs, to the generative AI model, the tuning parameter and a prompt that includes the set of attributes and the information about the segment. Then the personalization module receives, from the generative AI model, personalized content that is responsive to the tuning parameter and the prompt. The personalized content is then displayed, by the personalization module, in a dynamic content field associated with the content displayed on the web page.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
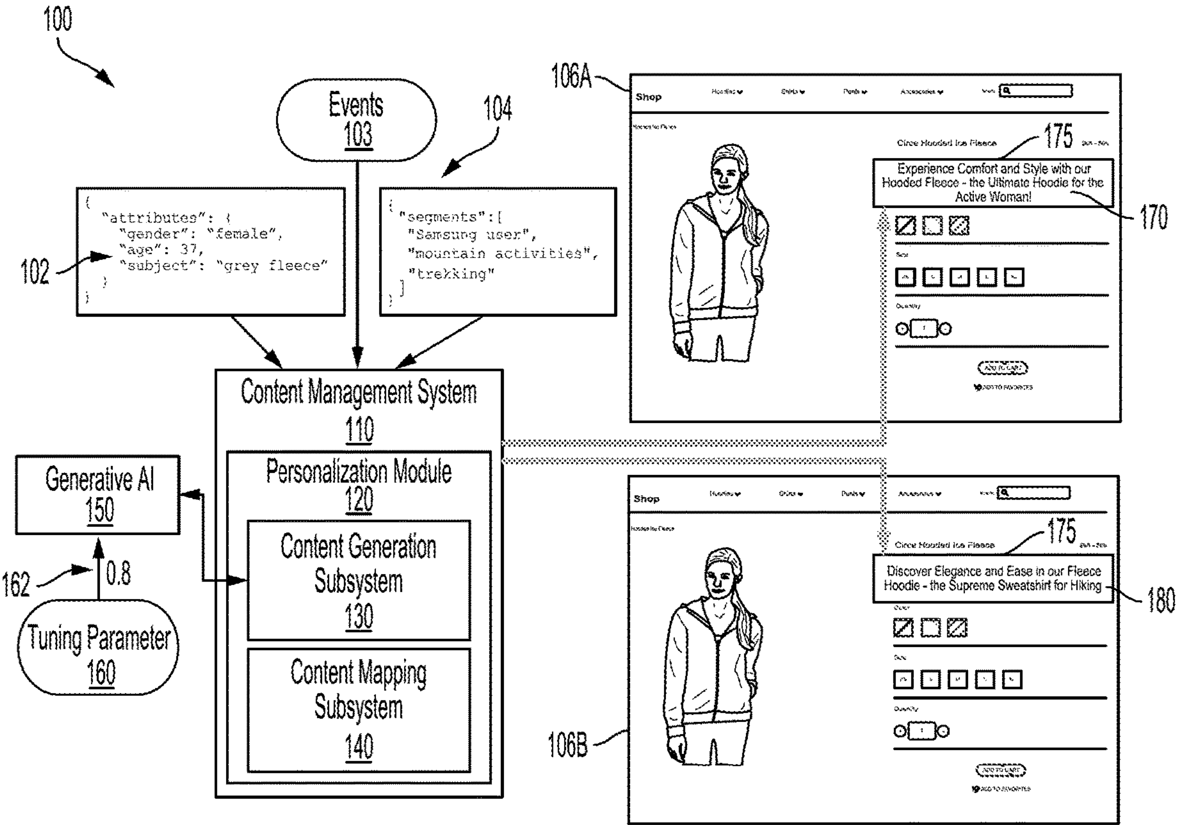
FIG. 1 is a diagram of an example system implementing techniques for generating personalized content using generative artificial intelligence (AI), according to certain embodiments.

User engagement is a fundamental measure of the effectiveness of the content and design of e-commerce websites, social media, mobile applications, games, online or streaming entertainment, virtual reality environments, among many other digital platforms. User interaction with digital content is an important signal representing the extent of user engagement. For example, strong measures of user engagement for a product description page on an e-commerce website involve user interactions such as adding the product to a "wish list" or purchasing a similar product.

Optimized user engagement correlates closely with personalized content. For example, personalized content can be generated based on user demographics, browsing history, or user behavior, among other types of data. However, curating such content manually for individual users or even small groups of users is not scalable or practical in most cases. One common approach for the development of personalized content by content creators involves segmenting users into groups based on location, age, lifestyle, etc., and then mapping personalized content to these segments. The personalized content can then be dynamically selected (e.g., by an e-commerce platform) based on the segment(s) to which a particular user belongs.

Generative artificial intelligence (AI) has enabled a new approach to the development of personalized content. Prominent examples of generative AI include machine learning (ML) models called large language models (LLMs). Some LLMs can generate textual output in response to arbitrary human-readable queries ("prompts") using a chat-like interface. LLMs can thus be used for the generation of original content and leveraged further with programmatically generated prompts.

However, the output of a generative AI like an LLM is only as useful as the precision of the language used to express the prompt and the calibration of the parameters controlling the operation of the model. Thus, the use of generative AI to generate personalized content requires at least the development of prompts containing full, up-to-date representations of the desired response and a feedback mechanism for improving the prompts and calibrating the parameters used to operate the AI.

The invention described herein relates to techniques for generating personalized content using generative AI are provided. In an example method, a processing device includes a personalization module that includes, among other components, a content generation subsystem and a content mapping subsystem. The personalization module is configured to generate personalized content using generative AI such as an LLM. The personalization module receives an indication that a user interacted with content displayed on a web page, such as a product detail page for an e-commerce website. A typical product detail page may include the product title, taglines, product descriptions of varying length and levels of detail, specifications, and so on. The user may take various types of actions that are indicative of a subjective reaction to the content on the product detail page. If the user is considering purchasing the product, they may take actions such as adding the product to their cart, adding the product to a wish list, favoriting the product, and so on. Conversely, if the user is reacting negatively to the product, they may take actions such as leaving the product detail page or leaving a negative rating or review. Each of these user actions may correspond to an event as detected by a client device of the user and relayed to the processing device.

The indication thus received by the personalization module may be a data structure that includes information about the events that have taken place on the web page that correspond to actions taken by the user or users. In some examples, the indication may include information about positive events, or those events that correspond to a subjective positive disposition towards the product by the user such as the user completing a positive conversion. In some examples, the positive events may be grouped according to their association with the particular product or according to association with the user or with all users. For example, the indication may include information about 3 positive actions taken by the user, such as adding the product to a wish list, asking a question about the product, or sharing information about the product. Or the indication may include information about 3 positive actions taken with respect to a particular product, again, such as the product being added to a wish list, a positive review being created for the product, or the product being purchased.

The personalization module next or in parallel receives a set of attributes, including information about the user and information about the content. For example, in the case of a product detail page, the personalization module can receive a data structure including labeled, categorized information about the product including product name, description, and details such as the brand, style, size, and color of products. The same or a different data structure may also include information about the user. The set of attributes may be received from a diversity of sources. For instance, the user attributes may be received from a user database based on identifying information about the user such as login metadata. The product attributes may be received an API provided by the e-commerce website.

The personalization module next receives information about a segment to which the user belongs. For example, a segmentation service may provide facilities for collecting customer data and creating customer profiles. The segmentation service can return one or more segments that the user belongs to based on identifying information about the user or the user attributes. For example, if a logged in user has been identified, the segmentation service may return information indicating that the user belongs to the segments "female" and "age 32" based on an identifier of the user. The segments may thus correspond to categorizations or other generalizations about the user.

The personalization module then determines a tuning parameter for a generative AI model, wherein the tuning parameter controls the randomness of the output of the generative AI model. For example, some generative AI models accept a temperature parameter for modulating the randomness of the output. A higher temperature corresponds to more randomness in the output given a prompt, where a lower temperature corresponds to less randomness given the same prompt. The personalization module may use information about the user interactions, including the events associated with those interactions, to determine the tuning parameter. For instance, the personalization module may use counts of events associated with the user or the product to determine the tuning parameter.

The personalization module inputs to the generative AI model the tuning parameter and a prompt comprising the set of attributes and the information about the segment. For example, the personalization module may generate a human-readable prompt using the set of attributes and the information about the segment. The generated prompt and tuning parameter may be added to a data structure which may be sent to the generative AI using a web-based API or other suitable interface. An example prompt may be "Generate a product description for a grey hooded fleece for a woman of age 32 who is an iPhone user and enjoys outdoor activities, given that the previous description was 'Stay Active and Connected with our Grey Hooded Ice Fleece—the perfect hoodie for the modern woman.'" Sending of the prompt to the generative AI may be accompanied by instructions to use a specific temperature. For example, an API parameter can be used to specify a temperature of 0.8. Other formats may also be used to provide inputs to the generative AI.

The personalization module then receives, from the generative AI model, personalized content responsive to the tuning parameter and the prompt. The response may be generated by the generative AI in the context of the received prompt as well as previous prompts and responses from the same session. In some examples, the generative AI may be periodically refined using previous prompts, previous responses including personalized content, information about the user interactions, and other information. In that case, the received response is generated in the context of the information used to refine the generative AI. For example, a response to the above example prompt may be: "Experience Comfort and Style with our Grey Hooded Fleece—the Ultimate Hoodie for the Active Woman!" In some examples, responses are not limited to textual elements. Personalized content including graphical, audio, video, or other forms may be generated by suitable implementations of generative AIs.

The personalization module displays the personalized content in a dynamic content field associated with the content displayed on the web page. In this example, the product description is updated based on the personalized content returned by the generative AI. Thus, given the example response above, the personalization module can extract the portion of the response suitable for the web page. The web page can be dynamically updated with the updated response to display the personalized content.

The techniques disclosed herein for generating personalized content using generative artificial intelligence constitute improvements to the technical field of web page generation and administration. Web page generation and administration has evolved—and continues to evolve—from a cumbersome, manual process to a flexible, dynamic process that can be automated to a certain extent. But existing systems still rely on manual generation of content and fail to leverage of capabilities of generative AI. Using techniques described herein, data from multiple channels can be combined to develop a prompt for the generation of content by a generative AI. For instance, the data used to generate prompts can be a synthesis of data gathered about the individual user, groups or categorizations describing the user, information about the content, information about past and present behavior of the user, as well as the wealth of resources the generative AI itself can bring to bear on the content generation process. Website administrators can, in some cases, be unburdened from the chore of personalizing website content on an ongoing basis with the processing device thus improved.

Moreover, the results of using the generated content in the real world as measured by, for example, user interaction with the generated content can be used to generate still more content in a positive feedback loop. The generated content, steered using the tuning parameter, moves the website closer and closer to a positive event like a conversion as content is generated and re-generated using each new piece of information as it becomes available. Such precision marketing in near-real-time was not possible using existing tools, much less scalable. Thus, the techniques of the present disclosure can result in a higher conversion rate due to the highly personalized experience.

Definitions

As used herein, the term "generative artificial intelligence (AI)" refers to hardware and/or software module(s) including program code that can create new content or make predictions based on the data it has been trained on. For example, a generative AI may include a chatbot that can accept arbitrary textual prompts and then generate novel responses. Generative AI systems can generate text, graphics, video, audio outputs, combinations thereof, or other output formats.

As used herein, the term "large language model (LLM)" refers to a class of generative AI models trained on very large (e.g., terabytes) textual datasets that may exhibit a high capacity for generating sensible responses to arbitrary textual prompts. Common implementations utilize a Transformer-based architecture, a type of neural network that utilizes a "self-attention" mechanism that can weight the significance of different parts of the sequential input data, like text. LLMs have demonstrated the capability to generate human-like text, perform tasks like translation, summarization, question answering, and exhibit a broad understanding of language structure, context, and semantics.

As used herein, the term "prompt" refers to a set of instructions or data input given to a generative AI system, providing a context or query for the generative AI to generate subsequent output. For example, in the context of LLMs, a prompt can be a sentence, question, or any text string used to elicit a particular type of text generation from LLM. Prompts can be phrased in the form of human-readable sentences or in machine-readable formats appropriate for the particular specifications of the LLM.

As used herein, the term "response" refers to the output generated by a generative AI following the receipt of a prompt. The response may include text, graphics, audio, video, data structures, or a combination thereof. In the context of LLMs, a response typically involves a text generation that aligns with the context or information request provided by the initial prompt.

As used herein, the term "conversion" refers to a typically positive event caused by a user of some digital content that fulfills a desired goal of the owner or producer of the digital content. For instance, in the context of web marketing, a conversion can be defined to include events such as a product purchase, adding the product to a wish list, indicating that the product is a favorite, and so on. Some example systems use the conversion rate, or a ratio of certain numbers of position events to the total number of possible events that may have occurred (e.g., the total number of visitors to a particular website), as a metric for determining whether to change or update digital content to improve the conversion rate.

As used herein, the term "segment" refers a subset of a larger population, like an audience or customer base, which is defined by specific shared characteristics. These characteristics can range from demographics like age, gender, or location, psychographics like interests, attitudes, or values, behaviors like user activity or purchase history, or other criteria that are relevant to the context. For example, a particular user may belong to segments like "iphone user," "mountain climber," "middle-aged female," and so on.

Overview

FIG. 1 is a diagram of an example system 100 implementing techniques for generating personalized content using generative artificial intelligence (AI). Example system 100 depicts a product detail page 106 for an item of apparel as might be found on a typical e-commerce website. The product detail page 106 may include a variety of elements intended to communicate information relevant to a purchase decision to a user such as the name of the product, a product description 170, controls for selecting size, color, etc., images, reviews, and so on.

However, the depiction of a product detail page 106 is merely an example and one of ordinary skill in the art will recognize that the techniques implemented by example system 100 can be applied in variety of contexts such as social media, email marketing, chatbots, customer service, interactive content (e.g., quizzes or calculators), video marketing, virtual reality (VR) or augmented reality (AR) productions, video games, to name a few typical examples.

System 100 includes a content management system (CMS) 110 which may include components for content creation, storage, editing, and distribution of digital content. For example, CMS 110 may be used to manage web content for an e-commerce web site. A typical example of CMS 110 is the Adobe Experience Manager, but the techniques of the present disclosure apply equally to other CMSs.

CMS 110 includes a personalization module 120. The personalization module 120 may be used to generate and map personalized content to digital content containers like web pages on an e-commerce website. Personalization module 120 includes a content generation subsystem 130. The content generation subsystem 130 may be configured to cause a generative AI 150 to generate new or updated content based on prompts tailored to improve the personalization of content for a particular user or group of users. For example, the content generation subsystem 130 may receive attributes 102, including information about the user and/or about the subject of the digital content (e.g., a product).

The content generation subsystem 130 may also receive information about one or more segments to which the user belongs. For instance, the attributes 102 received by the content generation subsystem 130 may indicate that a web shopper is a 37 year-old female and that the subject of the content is a grey fleece. Identifying information about the user can be used to determine segments to which the user belongs. The example segment 104 describes its members as being Samsung users who enjoy mounting activities such as trekking. Segments may be determined on the basis of previously obtained information, retrieved from third-party sources or other databases, or inferred from user information and behaviors, among other possible mechanisms.

The content generation system 130 may also receive information about events 103 that have occurred with respect to the content, such as an indication that a user interacted with content displayed on a web page. Events 103 may include actions taken by users with respect to particular content, with each event 103 indicative of a positive predisposition towards the subject matter of the content. For instance, events like the addition of an item to a virtual shopping cart or wish list may be indicative of an inclination to purchase the item and can thus be used as a signal for the generation of personalized content. In this example, events 103 corresponding to a positive predisposition are used, but any type of event or user behavior may be relevant to the development of personalized content, including neutral or negative events.

The content generation subsystem 130, based on some or all of these inputs, can determine a tuning parameter 160 for the generative AI 150. In some examples, the tuning parameter may control the randomness of the output of the generative AI 150. However, other aspects of the generative AI 150 may be controlled with the tuning parameter 160 such as exploration, precision and recall, the speed vs. accuracy tradeoff, the number of neural network layers, and so on. Examples of tuning parameters 160 include presence penalties, frequency penalties, stopping criteria, beam searches, reward models, soft prompts, and others.

For example, the tuning parameter 160 may be a temperature 162 that can range from 0.0 to 1.0. A temperature 162 of 1.0 corresponds to completely new content, as compared with the original content. A temperature 162 of 0.0 corresponds to no or almost no changes to the original content. In some examples, an algorithm may be used to determine a tuning parameter 160 based on events relating to a particular user or subject matter (like a product). The algorithm may be defined to determine a tuning parameter 160 value that is optimized for a particular goal or strategy like improving conversion rates on an e-commerce website. In some examples, an algorithm may use an accumulation of certain events 103 as a signal that the generated content is having a positive effect on conversion rates and that randomness should therefore be reduced (i.e., the temperature should be lowered).

The content generation subsystem 130 can generate a prompt based on some or all of these inputs. For example, the content generation subsystem 130 may combine the information from the attributes 102, information about the events 103, and the user segment information 104 to generate a human-readable prompt. The prompt may be in the form of a sentence, paragraph, or paragraphs, and phrased as if it were a request to another human being. In some examples, the prompt may be in a semi-structured format.

The content generation subsystem 130 may then input the generated prompt to the generative AI 150. Generative AI 150 includes a class of technologies that can generate original content on the basis of a substantial volume of training data. For example, generative AI 150 technologies exist for generating original text, graphical content, and even audio content. Well-known examples of generative AI 150 technologies for the generation of text include ChatGPT, Claude, Language Model for Dialogue Applications (LaMDA), Bard, and many others. Examples of AI technologies for the generation of graphical content include DALL-E, MidJourney, and Adobe Sensei.

One type of generative AI 150 for textual content is built on machine learning (ML) models called large language models (LLMs). These LLMs, such as Generative Pretrained Transformer (GPT)-3 or -4, Bidirectional Encoder Representations from Transformers (BERT), and Turing-Natural Language Generation (NLG), are trained on substantial volumes of training data to make predictions about the sense and accuracy of responses to "prompts." LLMs can complete prompts, translate languages, answer questions, and write fiction, among many other capabilities. Technologies like ChatGPT rely on LLMs like GPT-4 to generate textual output in response to human prompts using a chat-like interface. Such technologies often expose application programming interfaces (APIs) for programmatic use by applications. Thus, in response to sending the prompt to the generative AI using a web-based API, a response may be received from the generative AI 150.

As shown in example system 100, the generative AI 150 is an externally-hosted component with respect to the content management system 110. Externally-hosted generative AI 150 systems are typically accessible by the public and are known as public instances. However, the generative AI 150 may be a component of the content management system 110. For example, the generative AI 150 can be a component of the personalization module 120. In this case, the generative AI 150 may be a private instance.

Private instances of the generative AI 150 allow for exclusive access, customization, and control tailored to specific organizational needs. Public instances, on the other hand, are shared and provide broader access, possibly serving multiple users or organizations. In some examples, however, even public instances can be partitioned or siloed so that they are functionally identical to private instances with respect to data separation and privacy.

For example, a typical example prompt generated based on the product description 170, the attributes 102, information about the events 103, the user segment information 104, and the tuning parameter 160 may be: "Generate a new product description for a grey hooded fleece. The description is currently 'Experience Comfort and Style with our Hooded Fleece—the Ultimate Hoodie for the Active Woman!' The user is a 37 year old female. She is a Samsung phone user and enjoys mountain activities and trekking. She has added this item to her favorites. 3 other people have added this item to their favorites or purchased the item in the last month." This prompt may be sent to the generative AI 150 along with instructions to use a specific temperature. For example, the prompt and temperature may be sent to an API provided by generative AI 150, in which both the prompt and the temperature are included as objects in a data structure, like a JSON object.

The content generation subsystem 130 may receive, from the generative AI 150, personalized content responsive to the tuning parameter and the prompt. For example, in response to the previous example prompt, the generative AI 150 may respond, "Discover Elegance and Ease in our Fleece Hoodie—the Supreme Sweatshirt for Hiking." The updated description can be extracted from the response and used to update product description 170 contained in dynamic content field 175 to become updated product description 180, as described next.

Personalization module 120 also includes a content mapping subsystem 140 to map the generated content to certain dynamic content fields 175 to write new or update existing content. The dynamic content field 175 may be a portion of the web page that can be identified using a unique identifier and updated using suitable program code. In product detail page 106 the product description 170 is contained in dynamic content field 175. The content mapping subsystem 140 may cause the generated response including new or updated content to display in a dynamic content field 175 associated with the content displayed on the web page.

The dynamic content field 175 may include a portion of the content and a dynamic content identifier, in which the portion of the content can be selectively updated using the dynamic content identifier. For example, the dynamic content field 175 may be defined by a <div> element in an HTML website that can be identified using a page-unique identifier like "product-description" to dynamically update the description. In some examples, the product description 170 may be changed to the updated product description 180 dynamically using, for example, JavaScript. In some other examples, the product description 170 may be changed to the updated product description 180 upon a reload of the product detail page 106.

Personalized Content Generation

Figure 2:
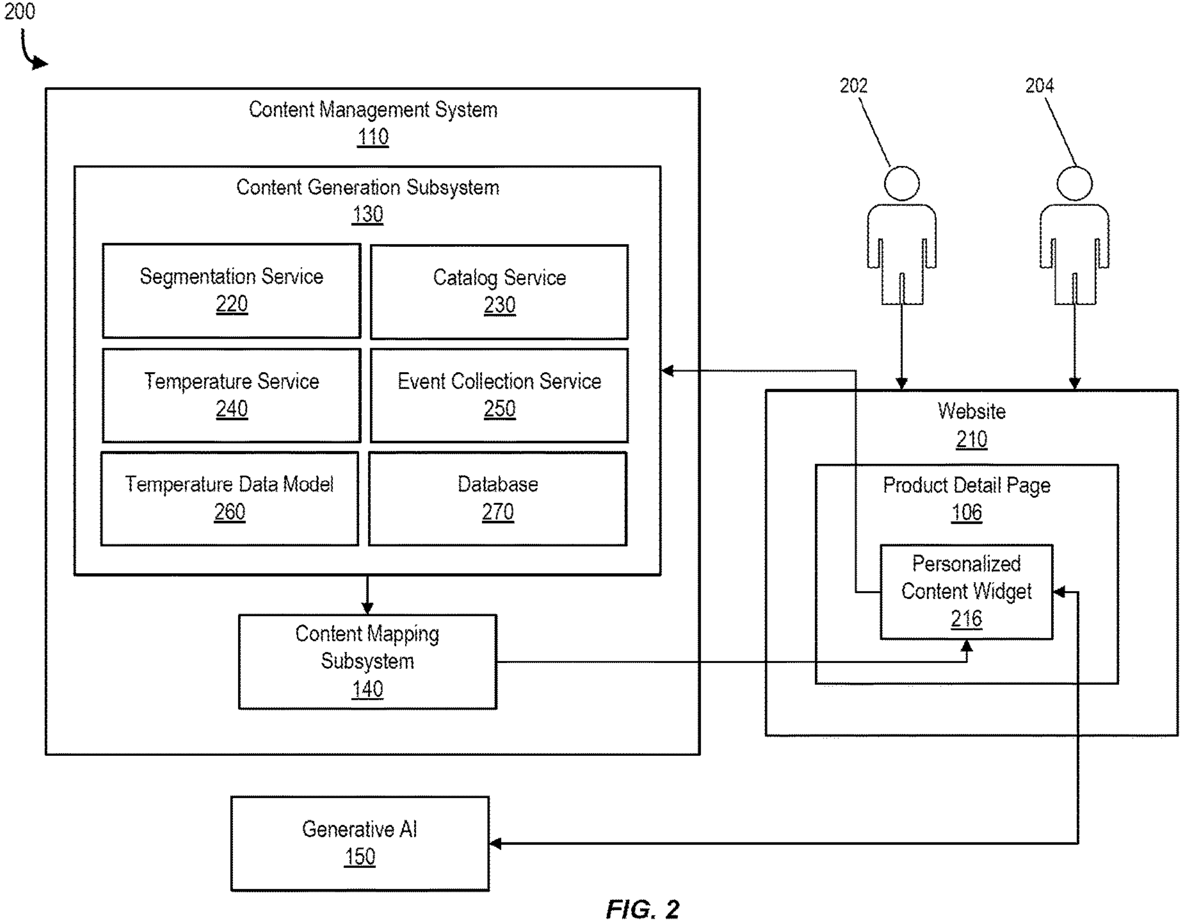
FIG. 2 shows an example system implementing techniques for generating personalized content using generative AI, according to certain embodiments.

FIG. 2 shows an example system 200 implementing techniques for generating personalized content using generative AI 150. System 200 includes detail of an example implementation of a content management system 110 including a content generation subsystem 130. The content generation system 130 may be implemented in software, hardware, or a combination of both. Content generation subsystem 130 may be used to generate personalized content for website 210.

Website 210 may be included in an e-commerce platform and include a product detail page 106 similar to the examples shown in FIG. 1. In some examples, the product detail page 106 includes a personalized content widget 216. For example, personalized content widget 216 may include JavaScript code for executing frontend functionality like monitoring user behavior and events and mapping of new or updated content to dynamic content fields.

The product detail page 106 typically corresponds to a particular SKU (Stock Keeping Unit), representing a specific item for sale, characterized by unique attributes such as color, size, manufacturer, price, etc. These attributes are represented on the product detail page 106, which may provide information about the particular SKU including details such as its features, pricing, availability, and so on.

Users 202 and 204 are browsing the website 210. The generation of personalized content may begin with a user 202 navigating to a product detail page 106 that includes a personalized content widget 216. The personalized content widget 216 or other component of the website 210 can determine the identity of the user 202. For example, the user 202 may be logged into the website 210. In that case, web browser of user 202 may contain a cookie or data saved to local storage that includes identifying information about user 202. The identifying information about user 202 can be used as a basis to index or label events and other related user behaviors, obtain segmentation data, to personalize the generated content returned by generative AI 150, among other functions.

The content generation subsystem 130 includes segmentation service 220. Segmentation service 220 can receive information about user 202 and return information about the user segments to which the user belongs. For example, the personalized content widget 216 may be configured to use a client-side JavaScript library such as the Adobe Experience Platform Web SDK or Adobe Alloy to access a segmentation service 220. The user segments returned by segmentation service 220 may include groupings based on, for example, user behavior, demographic information, or engagement metrics. In some examples, the segmentation service 220 may return a data structure, like a JavaScript Object Notation (JSON) object, including a list or other suitable grouping of the user segments to which the user 202 belongs. The list may include the names or other identifiers of the user segments. The segmentation service 220 may also be used to look up descriptive names for the user segments for the population of prompts for generative AI 150.

The content generation subsystem 130 includes catalog service 230. The personalized content widget 216 can send information about the SKU corresponding to the product detail page 106 to the catalog service 230 to obtain the information needed to populate the various fields of the product detail page 106 such as the title, description, images, options, and so forth. The catalog service 230 may send information about the particular SKU in a standard format suitable for parsing and population of the fields of the product detail page 106. In some examples, the information returned may be used to populate dynamic content fields that will later be updated with personalized content. Thus, the catalog service 230 may provide default content for personalizable fields. The default content may be used in the absence of personalized content (e.g., a first-time user with no accumulated behavioral data) or when the generative AI 150 service is unavailable.

In this example content generation subsystem 130, the tuning parameter 160 is a temperature. The content generation subsystem 130 includes temperature service 240. The temperature service 240 can be used to return the temperature value to pass to the generative AI 150 given the current temperature value determined by the temperature data model 260, as described below. The temperature data model 260 may determine a new temperature value upon the detection of certain events, like the detection of a user or product event, or periodically. The determined temperature values may be stored in database 270 or ephemerally in an in-memory key-value store for faster, cached access. In some examples, the current temperature may be determined "just in time" or calculated on-demand. The temperature service 240 may thus return the current temperature for a given user/product pair.

The content generation subsystem 130 includes event collection service 250. For example, the personalized content widget 216 may include JavaScript code for monitoring for different kinds of events. Telemetry regarding the events caused by user actions can be sent to the event collection service 250 for indexing, classification, and storage. For example, the personalized content widget 216 may include JavaScript code for counting the number of times certain buttons are clicked that are linked to certain classifications, as described below. Additionally, personalized content widget 216 may collect other user behavioral data like mouse movements, click patterns, and time spent viewing certain elements, etc. from which additional event data may be inferred.

Events may be broadly classified as positive or negative, but these are merely heuristic descriptions. Implementations will typically explicitly define positive events, and therefore negative events by exclusion. Positive events, in the context of the subject of a product detail page 106 or other content, may include events like the addition of an item to a virtual cart, adding the item to a wish list, favoriting an item, sharing an item, positively reviewing an item (e.g., 4 or more stars out of 5), or clicking on product detail page 106 controls to obtain more information, among many other possible events.

Some examples may utilize explicitly-defined neutral or negative events for the development of personalized content. For example, a tuning parameter 160 may be a function of positive user or product events, neutral user or product events, and/or negative user or product events. In some examples, events or user behaviors may be used for the determination of the tuning parameter 160 or prompts that cannot be classified using the positive/negative heuristic but may nevertheless be relevant to the development of personalized content. For instance, a user may update their address, read a news article, or send a social media message. These example events may be unrelated to the user's subjective opinion about the product but may still be used for the development of personalized content.

In some examples, events can be further classified into at least two types: user events and product events (sometimes referred to more generally as content events). In this example, a product event is a positive event associated with the content, like a product associated with a product detail page 106, that is caused by any user. A user event, on the other hand, is a positive event associated with the product or content that is caused by a specific user.

For instance, consider a product detail page 106 on an e-commerce platform marketing a fleece for sale. During a pre-determined period of time, a number of users may browse to the product detail page 106 and take actions causing various events. Likewise, a particular user 202 may browse to the product detail page 106 and take actions causing various events. If 10 users browse to product detail page 106 and 5 of those 10 users each take a positive action like adding the product to their cart, then 5 product events may be counted. Likewise, if user 202 browses to the product detail page 106 and takes 5 positive actions like adding the product to their wish list, then 5 user events may be counted. In some examples, certain user events may thus be double-counted, but some implementations may be configured to only count events in one category or the other. Product events are thus scoped to all users, where user events are scoped only to a particular user 202.

The content generation subsystem 130 includes temperature data model 260. Temperature data model 260 includes components for calculation of the current temperature value given information about events relating to the user 202, all users, and the subject of the product detail page 106 (e.g., events relating to the product). In a typical example, the temperature is a function of all positive events caused by a particular user 202 with respect to a product as well as all positive events caused by any user with respect to the product. The temperature data model 260 receives information about events from event collection service 250 or from other components.

In some examples, the temperature data model 260 may recalculate the temperature value for each new event received. In some examples, the temperature may be recalculated when a predetermined threshold number of events are received. In yet other examples, the temperature may be recalculated periodically. The determined temperature values may be stored in database 270 or ephemerally in an in-memory key-value store for faster, cached access. The temperature service 240 may thus return the current temperature for a given user/product pair. The most recently calculated temperature may be looked up using indexes that are identifiers of the user 202 and the product.

In one example in which the tuning parameter 160 is a temperature, the temperature may be given by:

$$Temp(U, P) = \begin{cases} 0 & \text{if } E(U) + F(P) \geq S \\ 1 & \text{if } E(U) + F(P) = 0 \\ 1 - \dfrac{E(U) + F(P)}{S} & \text{if } 0 < E(U) + F(P) < S \end{cases} \quad (1)$$

In this equation, U is the user, P is the product, Temp(U, P) is the temperature as a function of information about the user and the product, respectively, E(U) is a number of user events, F(P) is a number of product events, and S is a pre-determined threshold associated with the temperature.

The pre-determined threshold S may correspond to an indication that an optimized element of content has been generated for the particular user 202 or product. S may be determined empirically, through a process of trial and error, A/B testing, or other suitable method. For example, if S is 10, then if some combination of the number of user and product events sums to 10 or more, then the temperature value for that user 202 or product is assigned 0 and no or few further changes to the relevant content will be generated by generative AI 150. In some examples, a temperature value of 0 will cause prompts to no longer be sent to the generative AI 150, saving the round-trip transaction that will result in no change to the input.

Similarly, if the number of user 202 and product events sums to 0 (i.e., no positive events of any type recorded yet), the temperature value may be set to 1, corresponding to maximal randomness, or the greatest variability between responses, given the same prompt. In this case, since there is no behavioral data available, maximum randomness may be used to ensure that the parameter space of generated content is more fully explored.

Between these two extremes, the sum of the number of user and product events are divided by the pre-determined threshold S. The quotient is subtracted from 1 to determine the new temperature value. The example equation for determination of temperature shown in equation (1) is linear in the sum of the event counts. Thus, for low event counts, the temperature is near 1. As event counts increase, the temperature decreases linearly to 0.

The new temperature value may be determined upon receipt of new event counts by using, for example, an event-driven programming framework. In some other examples, the temperature may be determined periodically. For instance, temperatures for all users and products may be calculated for all user/product pairings every hour when changes to the relevant event counts are noted.

The content generation subsystem 130 includes database 270. The database 270 may be a persistent disk- or cloud-based store such as a Structured Query Language (SQL) or document-based database. In some examples, database 270 may be an in-memory key-value store or similar tool for ephemeral storage of some or all values. Database 270 may be used to store information about user segments, products, calculated temperature values, events, generated prompts and received responses, and so on. In some examples, stored information may be indexed to identifiers associated with a particular user 202, user segments, events, or some combination thereof.

Figure 3:
FIG. 3 shows an example system implementing techniques for generating personalized content using generative AI, according to certain embodiments.
Figure 3:
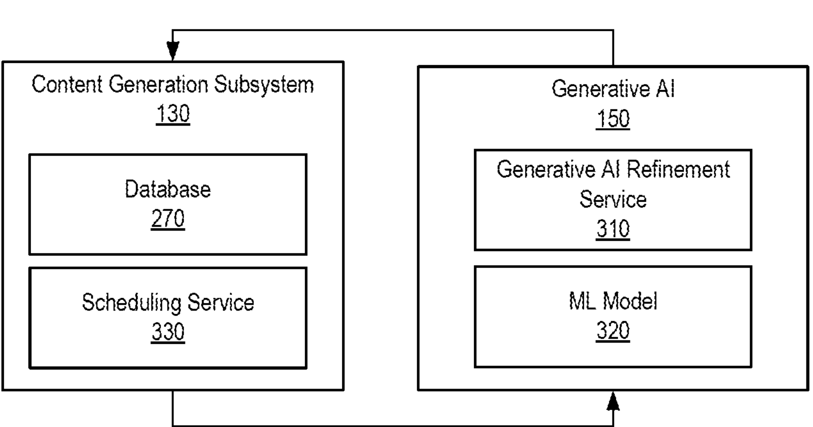

FIG. 3 shows an example system 300 implementing techniques for generating personalized content using generative AI 150. System 300 includes detail of an example implementation of content generation subsystem 130 interacting with a generative AI 150 for refining of the generative AI 150 given new or updated information.

Content generation subsystem 130 includes scheduling service 330 for periodically refining the generative AI 150. The scheduling service 330, at a configurable periodicity, can query database 270 for information about user segments, products, calculated temperature values, events, generated prompts and received responses, and other data indexed according to user or product. The scheduling service 330 can generate data for refining the generative AI 150.

For example, the scheduling service 330 may query database 270 for subsets of prompts and associated responses that subsequently resulted in a positive event. In this example, prompts and responses for a particular user or product may be stored with a timestamp. Database 270 can be queried for positive events that occurred in relation to the user or product after a period of time following updating a website using content generated by the generative AI 150. In some examples, the scheduling service 330 may generate structured data for refining the generative AI 150. For instance, the structured data format may be a JSON object that includes prompts and responses associated with positive events. One such example JSON object is a collection of prompt/completion objects including fields {"prompt": "<prompt text>", "completion": "<generated text>"}, in which the <prompt text> field includes the text of a particular prompt included in the subset and the <generated text> field includes the response to the particular prompt.

In some implementations, generative AI 150 includes a generative AI refinement service 310 and an ML model 320. For example, generative AI refinement service 310 may receive input that can be used to refine the ML model 320. As discussed above, the ML model 320 may be an LLM or other type of ML model suitable for the generation of responses to text prompts. In some examples, the generative AI 150 is an externally-hosted service or third-party service. In that case, the ML model 320 may be a clone or copy of a generally-available ML model 320 suitable for use by a specific organization or platform, like an e-commerce website. External interfaces to the generative AI refinement service 310 may be provided for refining the ML model 320. For example, the generative AI refinement service 310 may receive input, such as the data structure for refining the generative AI 150, as described above. In one example refinement technique, all subsequent responses to prompts may be given in the context of the input data structure.

Figure 4A:
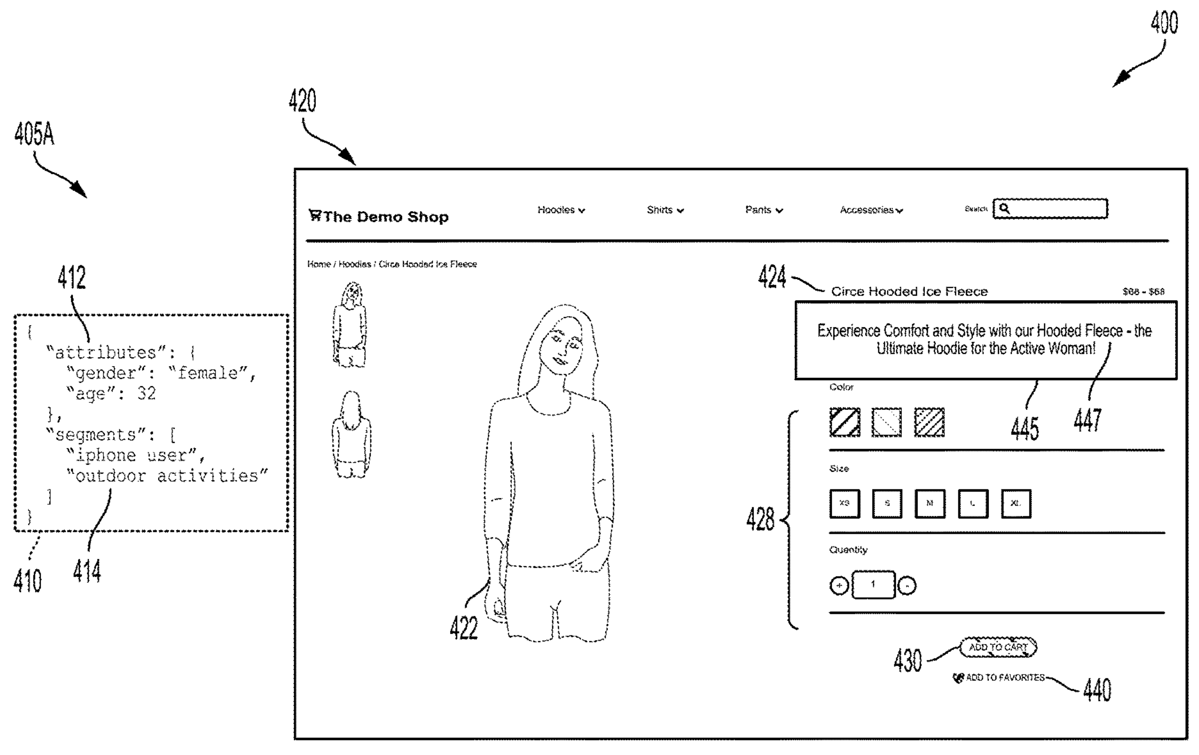
FIG. 4A illustrates an example website including a product detail page utilizing techniques for generating personalized content using generative AI, according to certain embodiments.
Figure 4B:
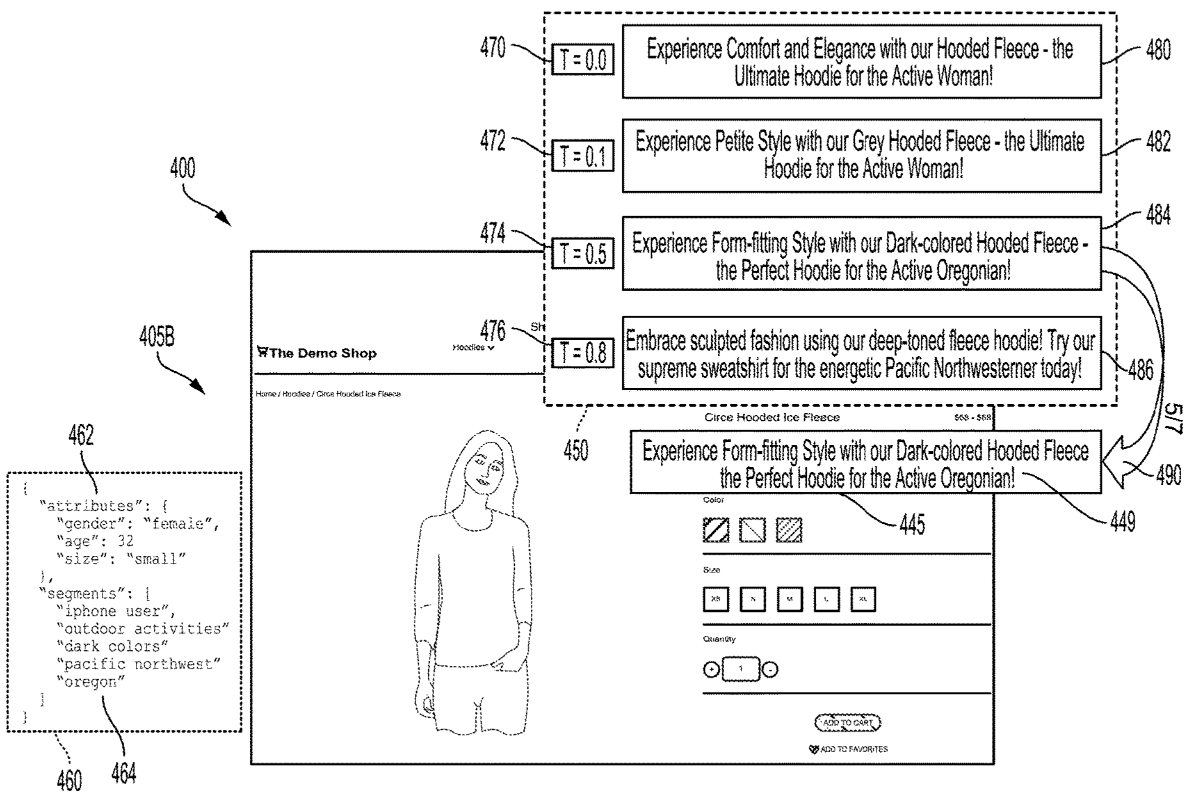
FIG. 4B illustrates further details of an example website including a product detail page utilizing techniques for generating personalized content using generative AI, according to certain embodiments.

FIGS. 4A-B illustrate an example website 400 including product detail pages 405A and updated product detail page 405B utilizing techniques for generating personalized content using generative AI 150. FIG. 4A shows example product detail page 405A included in website 400. The example product detail page 405A depicted in website 400 includes example elements that may be found on a typical product detail page 405A, but they are merely examples. Other elements, including personalizable elements, may be found on variations of product detail page 405A, and indeed on other content containers outside the context of web-based sales and marketing. For example, techniques disclosed herein may be used in social media, email marketing, audio content (e.g., podcast advertising), or video, among other possible media.

In the illustrated example, product detail page 405A includes a header 420 showing the name of the e-commerce website 400, various drop-down menus, and a search box. Product detail page 405A includes a product image 422 that is the subject of the product detail page 405A. In this example, the product is a hooded fleece garment, but the product could be any tangible product in any category. Product detail page 405A includes the product name 424. Product detail page 405A also includes controls 428 for customizing the product. For example, the color, size, or quantity of the product can be adjusted. In some examples, the controls 428 may cause other elements on the page to update. For instance, changing the color control may cause the color of the product image 422 to update.

Product detail page 405A includes buttons that may correspond to positive events, as described above with respect to event collection service 250. For example, button 430 is an add to cart button and button 440 is an add to favorites button. Pushing either or both of these buttons may be counted as a user and/or product event, which can be contribute to changes to the calculated tuning parameter 160.

As shown in FIG. 1, product detail page 405A includes product description 447. Product description 447 is an example of text contained in a dynamic content field 445. A dynamic content field 445 comprises or is included on some portion of the product detail page 405A and a dynamic content identifier. The dynamic content field 445 can be selectively updated using the dynamic content identifier. For example, in a typical configuration, the product description 447 would be contained a dynamic content field 445 defined by an HTML <div> element or other block-level construct. JavaScript or another suitable programming language can be used to update the text contained in a block-level element using the dynamic content identifier, as well as other techniques for dynamically updating content. For instance, the product detail page 405A could be re-rendered by a web server.

Techniques for generating personalized content using generative AI 150 may be used to generate personalized content for updating product description 447 or other textual fields or graphical fields of product detail page 405A. For example, the information block 410 about the user attributes 412 and related segmentations 414, in concert with information about the product itself, may be used to create a prompt that can be responded to by generative AI 150.

For example, using some of the information available in both information block 410 and the product detail page 405A, one example prompt may be "Starting with 'Experience Comfort and Style with our Hooded Fleece—the Ultimate Hoodie for the Active Woman!', write a new description of approximately the same length given that we now know the user is a 32 year old female who is an iphone user and enjoys outdoor activities. The product is a grey hooded fleece with a black interior with a zipper in the front." An example output to that prompt may be "Dive into Adventure with our Hooded Fleece—the Essential Companion for the Outdoors-Enthusiast Woman in her Prime!" In some examples, the response may be affected by a tuning parameter 160 as discussed in FIG. 4B.

FIG. 4B shows example updated product detail page 405B included in website 400. In FIG. 4B, additional user segment information 464 and attributes about the user 462 have been obtained in updated information block 460. For example, the user 202 may have input residential information while shopping and the associated user segments may have then been updated such that subsequent requests to segmentation service 220 now return "pacific northwest" and "oregon."

FIG. 4B also illustrates the updating of the product description 447 to updated product description 449 based on the updated information block 460 at several different values of the tuning parameter 160 in inset 450. In this example, the tuning parameter 160 is the temperature T with several values between 0.0 and 1.0. When temperature is used as the tuning parameter 160, lower values may correspond to less randomness and higher values may correspond to greater randomness.

Inset 450 shows 4 possible updates to product description 447 as shown in FIG. 4A. For temperature value 470 (T=0.0), corresponding to no randomness, an output 480 of the generative AI 150 is nearly unchanged from the original product description 447. For temperature value 470 (T=0.2), an output 482 of the generative AI 150 differs by only a few words from the original product description 447. For temperature value 474 (T=0.5), an output 484 of the generative AI 150 changes several words of the original product description 447. For temperature value 476 (T=0.8), an output 486 of the generative AI 150 is a near-entire rewrite of the original product description 447, including structural changes to the text. As depicted by arrow 490, in the illustrated example, the output 484 corresponding to temperature 747 (T=0.5), which is determined using the methods described above with respect to the temperature data model 260, is used by content mapping subsystem 140 as updated product description 449.

Method for Generating Personalized Content using Generative AI

Figure 5:
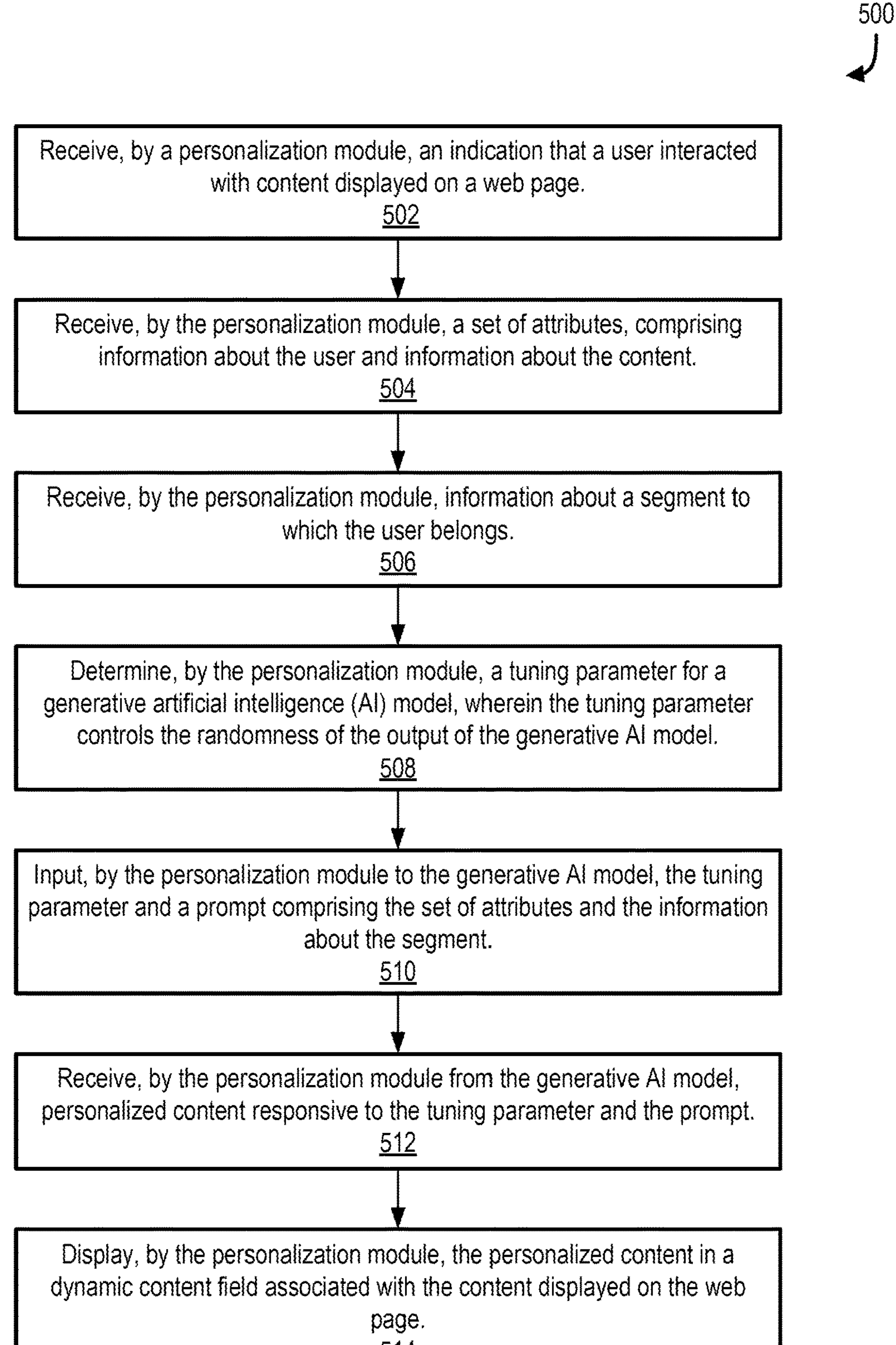
FIG. 5 is a flow diagram of an example of a process for techniques for generating personalized content using generative AI, according to certain embodiments.

FIG. 5 is a flow diagram of an example process 500 for generating personalized website content using generative AI. The process 500 depicted in FIG. 5 may be implemented in software executed by one or more processing units of a processing device, implemented in hardware, or implemented as a combination of software and hardware. This process 500 is intended to be illustrative and non-limiting. The example process herein is described with reference to the example personalization module 120 of content management system 110 depicted in FIG. 1, but other implementations are possible. Although FIG. 5 depicts various processing operations occurring in a particular order, the particular order depicted is not required. In certain alternative embodiments, the processing may be performed in a different order, some operations may be performed in parallel, or operations may be added, removed, or combined together.

At block 502, the personalization module 120 receives an indication that a user 202 interacted with content displayed on a web page. For example, a user browsing the web page may take various types of actions that are indicative of a subjective reaction to the content on the web page. Some actions may correspond to events. For instance, the user 202 may click a button, like an "Add to Cart" button, which is indicative of a positive reaction. JavaScript code may be used to monitor for and tally such events locally to each client device, or they may be tracked on an external server. For example, clicking the "Add to Cart" button may cause a web request to be sent to a particular application programming interface (API) hosted by the personalization module 120, which may then store information about the interactions of user 202. For example, personalization module 120 may include an event collection service 250 as described in FIG. 2 and the accompanying description.

The indication that the user 202 has interacted with content received by personalization module 120 may include a data structure that includes information about the events that have taken place on web page that correspond to actions taken by the user or users, as well as identifiers of the associated content. The indication may be sent as the events occur or periodically, individually or in batches. In an example, the data structure may be a JSON object that includes information about a product, information about the user 202, and event counts associated with the product and user, respectively. The product, user, and events may be represented by string or numeric identifiers that can be used for indexing the information for storage and later retrieval.

At block 504, the personalization module 120 receives a set of attributes comprising information about the user and information about the content. For example, in the case of a product detail page, the personalization module 120 can receive a data structure including labeled, categorized information about the product including product name, description, and details such as the brand, style, size, and color of products. The data structure may also include information about the user 202 may include demographic data, behavioral data, client device data, interests, hobbies, preferred activities, and so on.

The set of attributes may be received from a diversity of sources. For instance, the user attributes may be received from a user database based on identifying information about the user such as login metadata. In other examples, the user attributes can be based on other sources of user interactions at the website (e.g., the e-commerce platform) including search queries, browsing history, or site profile data. In some examples, third-party data sources can be sources of user interaction data, such as social media activity or external browsing habits. In some examples, the user interaction data is received from the segmentation service 220 but the user interaction data can also be received directly from other sources.

Likewise, the product attributes may be received from an API provided by the e-commerce website or from a catalog service 230, as described above. Product attributes may include information such as product category, brand, price, availability, SKU details, and customer ratings and reviews. Some examples may include additional metadata like current inventory levels, sales history, and seasonal trends that can be included in prompts sent to generative AI 150.

At block 506, the personalization module 120 receives information about a segment to which the user belongs. For example, a segmentation service 220 can receive identifier information about a user and return a list or other data structure including information about the segments to which a user belongs. For example, if a logged in user has been identified, the segmentation service 220 may return information indicating that the user belongs to the segments "female" and "age 32" based on an identifier of the user. The segments may thus correspond to categorizations or other generalizations about the user. For instance, segments may include demographic attributes like age and gender or behavioral attributes like purchase history, browsing behavior, and user preferences. Segmentation service 220 may provide a web-based API for the receiving the identifying user 202 information and for providing the segmentation data.

At block 508, the personalization module 120 determines a tuning parameter 160 for a generative AI 150, wherein the tuning parameter 160 controls the randomness of the output of the generative AI 150. For instance, the tuning parameter 160 may be a temperature parameter for modulating the randomness of the output. A higher temperature corresponds to more randomness in the output given a prompt, where a lower temperature corresponds to less randomness given the same prompt. The personalization module 120 may use information about the user interactions, including the events associated with those interactions, to determine the tuning parameter 160. For instance, the personalization module 120 may use counts of events associated with the user or the product to determine the tuning parameter 160.

The tuning parameter 160 may be determined using an algorithm that utilizes counts of positive user and product events to calculate the temperature, as described above in FIG. 3 and the accompanying description. However, other data may be used to determine the tuning parameter 160 including the user or product attributes, segmentation data, historical prompt, response, and temperature data, and other behavioral data about the user 202. The calculation of the tuning parameter 160 may be, in some examples, configured to maximize conversion rates or to achieve other goals relating to the subject matter of the content.

At block 510, the personalization module 120 inputs to the generative AI 150, the tuning parameter and a prompt comprising the set of attributes and the information about the segment. For example, the personalization module 120 may generate a human-readable prompt using the set of attributes and the information about the segment. The generated prompt and tuning parameter may be added to a data structure which may be sent to the generative AI using a web-based API or other suitable interface. Prompts may be human readable text or they may use a pre-defined semi-structured format. For example, prompts may be JSON objects that include mixed collections of structured and human-readable data. The prompt format may be a configurable aspect of the generative AI 150.

At block 512, the personalization module 120 receives from the generative AI 150, personalized content responsive to the tuning parameter 160 and the prompt. For instance, if the prompt is a human-readable request, the response may be a human-readable response akin to the response that would be rendered by a human being. In some examples, the generative AI 150 includes a web-based API that can receive the prompt and return the response generated by the underlying ML model 320. The response may be generated by the generative AI in the context of the received prompt as well as previous prompts and responses from the same session. In some examples, the generative AI may be periodically refined using previous prompts, previous responses including personalized content, information about the user interactions, and other information. In that case, the received response is in the context of the information used to refine the generative AI.

Some example generative AI 150 systems may be generative AI models based on an underlying large language model (LLM). Such models may be trained to predict the next word given a prompt. The stochastic nature of the LLM output can be influenced by way of a tuning parameter 160, which can, for example, control the randomness of the LLM. However, the response may also depend on the quality and relevance of the training data. For example, an LLM trained primarily on scientific literature might not generate appropriate or optimized responses to prompts in a product marketing context. Therefore, the underlying LLM should be trained on diverse training data that may result in optimized, sensible responses.

Some example generative AI 150 systems may be further refined on a context-specific dataset. For example, the generative AI 150 can be periodically refined using information about prompts and responses that resulted in successful conversions that can improve the likelihood of a conversion. Some generative AI 150 systems may be refined as frequently as weekly or as infrequently as monthly. Refinement techniques such as data pruning, knowledge distillation, transfer learning, gradient clipping, and so on may be used to refine the responses of generative AI 150, using the context of previous prompts, responses, events, and other data.

At block 514, the personalization module 120 displays the personalized content in a dynamic content field associated with the content displayed on the web page. For example, the web page can be dynamically updated with the response to display the personalized content. The dynamic content field may be a portion of the web page that can be identified using a unique identifier and updated using suitable program code. For instance, a JavaScript framework can be used to update the text in a particular HTML block identified with a unique id tag, like a <div> element.

In some examples, an <iframe> HTML element can be used as a dynamic content field to embed and display another HTML document within the current one. In some other examples, popular web technologies such as Web Components or frameworks such as React or Angular can enable creation of reusable and encapsulated custom HTML elements that can hold dynamic content. In some examples, the web page is updated by the web server upon being reloaded by the user or upon a refresh being forced by the web server following the reception of new content. In some other examples, technologies like WebSockets or Server-Sent Events (SSE) can be employed to push dynamically updated content to the user client upon receipt from the generative AI 150.

Computing Environment

Figure 6:
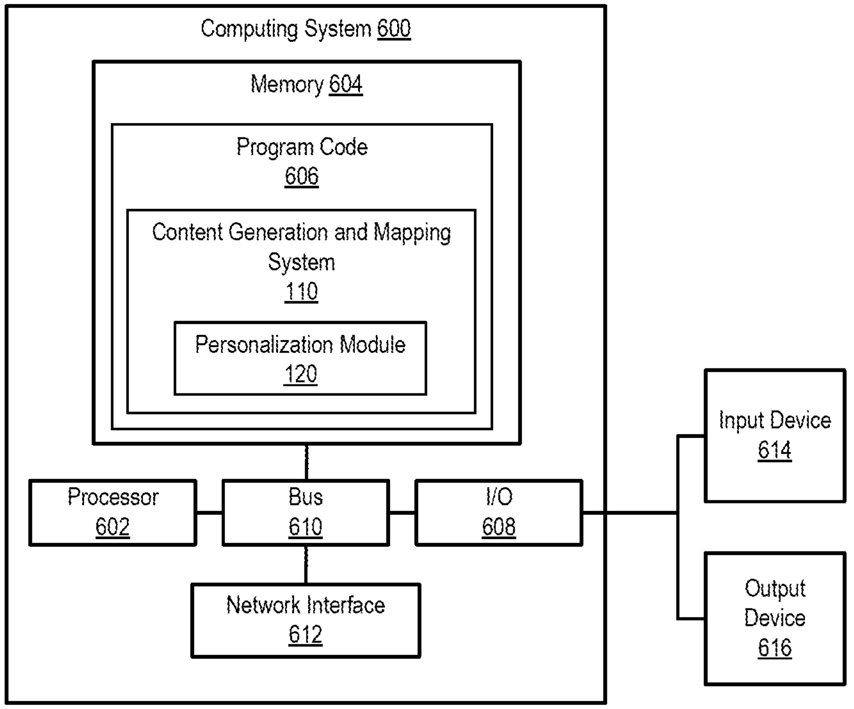
FIG. 6 depicts an example of a computer system that may be suitable for generating personalized content using generative AI, according to certain embodiments.

Any suitable computer system or group of computer systems can be used for performing the operations described herein. For example, FIG. 6 depicts an example of a computer system 600. The depicted example of the computer system 600 includes a processor 602 communicatively coupled to one or more memory devices 604. The processor 602 executes computer-executable program code stored in a memory device 604, accesses information stored in the memory device 604, or both. Examples of the processor 602 include a microprocessor, an application-specific integrated circuit ("ASIC"), a field-programmable gate array ("FPGA"), or any other suitable processing device. The processor 602 can include any number of processing devices, including a single processing device.

The memory device 604 includes any suitable non-transitory computer-readable medium for storing program code 606, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the memory device 604 can be volatile memory, non-volatile memory, or a combination thereof.

The computer system 600 executes program code 606 that configures the processor 602 to perform one or more of the operations described herein. Examples of the program code 606 include, in various embodiments, the content management system 110 including the personalization module 120 of FIG. 1, which may include any other suitable systems or subsystems that perform one or more operations described herein (e.g., one or more ML models, storage systems, controllers, or function-specific modules). The program code 606 may be resident in the memory device 604 or any suitable computer-readable medium and may be executed by the processor 602 or any other suitable processor.

The processor 602 is an integrated circuit device that can execute the program code 606. The program code 606 can be for executing an operating system, an application system or subsystem, or both. When executed by the processor 602, the instructions cause the processor 602 to perform operations of the program code 606. When being executed by the processor 602, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 604 store the program code 606 that includes one or more datasets described herein. In some embodiments, one or more of data sets are stored in the same memory device (e.g., one of the memory devices 604). In additional or alternative embodiments, one or more of the programs, data sets, models, and functions described herein are stored in different memory devices 604 accessible via a data network. One or more buses 610 are also included in the computer system 600. The buses 610 communicatively couple one or more components of a respective one of the computer system 600.

In some embodiments, the computer system 600 also includes a network interface device 612. The network interface device 612 includes any device or group of devices suitable for establishing a wired or wireless data connection to one or more data networks. Non-limiting examples of the network interface device 612 include an Ethernet network adapter, a modem, and/or the like. The computer system 600 is able to communicate with one or more other computing devices via a data network using the network interface device 612.

The computer system 600 may also include a number of external or internal devices, an input device 614, an output device 616, or other input or output devices. For example, the computer system 600 is shown with one or more input/output ("I/O") interfaces 608. An I/O interface 608 can receive input from input devices or provide output to output devices. An input device 614 can include any device or group of devices suitable for receiving visual, auditory, or other suitable input that controls or affects the operations of the processor 602. Non-limiting examples of the input device 614 include a touchscreen, a mouse, a keyboard, a microphone, a separate mobile computing device, etc. An output device 616 can include any device or group of devices suitable for providing visual, auditory, or other suitable sensory output. Non-limiting examples of the output device 616 include a touchscreen, a monitor, a speaker, a separate mobile computing device, etc.

Although FIG. 6 depicts the input device 614 and the output device 616 as being local to the computer system 600, other implementations are possible. For instance, in some embodiments, one or more of the input device 614 and the output device 616 can include a remote client-computing device that communicates with computing system 600 via the network interface device 612 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

General Considerations

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:

receiving, by a personalization module, an indication that a user interacted with content displayed on a web page;

receiving, by the personalization module, a set of attributes, comprising information about the user and information about the content;

receiving, by the personalization module, information about a segment to which the user belongs;

determining, by the personalization module, a tuning parameter for a generative artificial intelligence (AI) model, wherein the tuning parameter controls a randomness of an output of the generative AI model, wherein determining the tuning parameter is based on a number of positive events that occur in response to displaying the content, wherein the number of positive events comprises at least one of a product event or a user event, wherein the product event comprises a positive event associated with the content caused by any user and the user event comprises a positive event associated with the content caused by the user, wherein the tuning parameter is a temperature determined using the formula:

$$Temp(U, P) = \begin{cases} 0 & \text{if } E(U) + F(P) \geq S \\ 1 & \text{if } E(U) + F(P) = 0 \\ 1 - \dfrac{E(U) + P(S)}{S} & \text{if } 0 < E(U) + F(P) < S \end{cases}$$

wherein U is the user, P is the content, Temp(U, P) is the temperature, wherein E(U) is a number of user events, F(P) is a number of product events, and Sis a pre-determined threshold associated with the tuning parameter;

inputting, by the personalization module to the generative AI model, the tuning parameter and a prompt comprising the set of attributes and the information about the segment;

receiving, by the personalization module from the generative AI model, personalized content responsive to the tuning parameter and the prompt; and displaying, by the personalization module, the personalized content in a dynamic content field associated with the content displayed on the web page, wherein the dynamic content field comprises a portion of the content and a dynamic content identifier, wherein the portion of the content is selectively updated based on the temperature and using the dynamic content identifier.

2. The method of claim 1, further comprising:

determining, by the personalization module, that a positive event occurred in response to displaying the personalized content; and refining the generative AI model using a combination of the prompt, the personalized content, and information about the positive event.

3. The method of claim 2, wherein the positive event comprises the user completing a product conversion.

4. The method of claim 2, wherein the positive event comprises the user adding the content to a favorites list.

5. The method of claim 2, further comprising:

receiving, by the personalization module, a second indication that a second user interacted with the content displayed on the web page;

receiving, by the personalization module, a second set of attributes, comprising information about the second user and information about the content;

receiving, by the personalization module, second information about a second segment to which the second user belongs;

determining, by the personalization module, a second tuning parameter for the generative AI model, wherein:

the second tuning parameter results in less randomness of the output of the generative AI model as compared to the tuning parameter; and the second tuning parameter is based on one or more positive events that occur in response to displaying the personalized content;

inputting, by the personalization module to the generative AI model, the second tuning parameter and a second prompt comprising the second set of attributes and the second information about the second segment;

receiving, by the personalization module from the generative AI model, second personalized content responsive to the second tuning parameter and the second prompt; and displaying, by the personalization module, the second personalized content in the dynamic content field associated with the content displayed on the web page.

6. The method of claim 2, further comprising:

persisting, in a memory device:

an identifier corresponding to the content;

the set of attributes;

the information about the segment;

the prompt;

the personalized content; and the information about the positive event, comprising an event type and a timestamp, wherein refining the generative AI model using the combination of the prompt, the personalized content, and the information about the positive event comprises:

periodically generating, using the information persisted in the memory device, a data structure; and inputting, by the personalization module to the generative AI model, the data structure to cause the personalized content generated by the generative AI model to be generated in response to the information persisted in the memory device.

7. The method of claim 1, wherein receiving the information about the segment comprises:

determining an identity of the user;

determining an identifier of the user based on the identity of the user;

determining information about the user based on the identifier of the user; and generating the information about the segment based on the information about the user.

8. The method of claim 7, further comprising determining, by the personalization module, that a positive event occurred in response to displaying the personalized content, wherein the prompt further comprises the information about the positive event and the information about the user.

9. The method of claim 1, wherein the personalized content is a text string.

10. The method of claim 1, wherein the personalized content comprises at least one of a text string, an image, a video, or an audio recording.

11. The method of claim 1, wherein the pre-determined threshold associated with the tuning parameter is determined using A/B testing.

12. The method of claim 1, wherein the temperature is recalculated in response to receiving a new user event or a new product event.

13. A system comprising:

a personalization module comprising:

one or more processors; and one or more non-transitory computer-readable storage media storing instructions which, when executed by the one or more processors, cause the one or more processors to perform operations including:

receiving an indication of a positive event associated with a user interacting with content displayed on a web page;

receiving a set of attributes, comprising information about the user and information about the content;

receiving information about a segment to which the user belongs;

determining a temperature for a generative AI model, wherein:

the temperature is a tuning parameter that controls a randomness of an output of the generative AI model;

the temperature is based on information about the positive event;

determining the temperature is based on a number of positive events that occur in response to displaying the content, wherein the number of positive events comprises at least one of a product event or a user event, wherein:

the product event comprises a positive event associated with the content caused by any user; and the user event comprises a positive event associated with the content caused by the user; and the tuning parameter is a temperature determined using the formula:

$$Temp(U, P) = \begin{cases} 0 & \text{if } E(U) + F(P) \geq S \\ 1 & \text{if } E(U) + F(P) = 0 \\ 1 - \dfrac{E(U) + P(S)}{S} & \text{if } 0 < E(U) + F(P) < S \end{cases}$$

wherein U is the user, P is the content, Temp(U, P) is the temperature, wherein E(U) is a number of user events, F(P) is a number of product events, and S is a pre-determined threshold associated with the tuning parameter;

inputting to the generative AI model, the temperature and a prompt comprising the set of attributes and the information about the segment;

receiving from the generative AI model, personalized content responsive to the temperature and the prompt; and displaying the personalized content in a dynamic content field associated with the content displayed on the web page, wherein the dynamic content field comprises a portion of the content and a dynamic content identifier, wherein the portion of the content is selectively updated based on the temperature and using the dynamic content identifier.

14. The system of claim 13, wherein the operations further include:

determining, by the personalization module, that a positive event occurred in response to displaying the personalized content; and refining the generative AI model using a combination of the prompt, the personalized content, and information about the positive event.

15. The system of claim 13, wherein the pre-determined threshold associated with the tuning parameter is determined using A/B testing.

16. The system of claim 13, wherein the temperature is recalculated in response to receiving a new user event or a new product event.

17. A non-transitory computer-readable medium storing instructions that, when executed by one or more processors, cause the one or more processors to perform operations including:

receiving, by a personalization module, an indication of a plurality of positive events associated with a user interacting with content displayed on a web page, wherein the plurality of positive events comprises a product event and a user event, wherein:

the product event comprises a positive event associated with the content caused by any user; and the user event comprises a positive event associated with the content caused by the user, determining, by the personalization module, a temperature, wherein:

the temperature is a tuning parameter that controls a randomness of an output of a generative AI model;

the temperature is based on a number of positive events, a number of negative events, and a pre-determined threshold;

determining the temperature is based on the number of positive events that occur in response to displaying the content, wherein the number of positive events comprises at least one of a product event or a user event, wherein:

the product event comprises a positive event associated with the content caused by any user; and the user event comprises a positive event associated with the content caused by the user; and the tuning parameter is a temperature determined using the formula:

$$Temp(U, P) = \begin{cases} 0 & \text{if } E(U) + F(P) \geq S \\ 1 & \text{if } E(U) + F(P) = 0 \\ 1 - \dfrac{E(U) + P(S)}{S} & \text{if } 0 < E(U) + F(P) < S \end{cases}$$

wherein U is the user, P is the content, Temp(U, P) is the temperature, wherein E(U) is a number of user events, F(P) is a number of product events, and S is the pre-determined threshold associated with the tuning parameter;

receiving, by the personalization module, a set of attributes, comprising information about the user and information about the content;

receiving, by the personalization module, information about a segment to which the user belongs;

inputting, by the personalization module to the generative AI model, the temperature and a prompt comprising the set of attributes and the information about the segment;

receiving, by the personalization module from the generative AI model, personalized content responsive to the temperature and the prompt; and displaying, by the personalization module, the personalized content in a dynamic content field associated with the content displayed on the web page, wherein the dynamic content field comprises a portion of the content and a dynamic content identifier, wherein the portion of the content is selectively updated based on the temperature and using the dynamic content identifier.

18. The non-transitory computer-readable of claim 17, wherein the operations further include:

determining, by the personalization module, that a positive event occurred in response to displaying the personalized content; and refining the generative AI model using a combination of the prompt, the personalized content, and information about the positive event.

19. The non-transitory computer-readable of claim 17, wherein the pre-determined threshold associated with the tuning parameter is determined using A/B testing.

20. The non-transitory computer-readable of claim 17, wherein the temperature is recalculated in response to receiving a new user event or a new product event.

* * * * *